(12) United States Patent       (10) Patent No.:     US 6,450,276 B1
Latcau                          (45) Date of Patent:     Sep. 17, 2002

(54) MODULAR VEHICLE FRONT END

(75) Inventor: Alexandru Latcau, Rochester Hills, MI (US)

(73) Assignee: Valeo Inc., Auburn Hills, MI (US)

( * ) Notice: Subject to any disclaimer, the term of this patent is extended or adjusted under 35 U.S.C. 154(b) by 0 days.

(21) Appl. No.: 09/365,318

(22) Filed: Jul. 30, 1999

(51) Int. Cl.[7] .............................................. B62D 25/08
(52) U.S. Cl. ..................... 180/68.4; 180/68.1; 296/194; 296/203.02
(58) Field of Search ............................... 180/68.1, 68.4, 180/68.6; 280/781, 785; 296/194, 203.02

(56) References Cited

U.S. PATENT DOCUMENTS

| | | | | |
|---|---|---|---|---|
| 4,141,426 A | * | 2/1979 | Hamada et al. ............ | 180/68.4 |
| 4,428,447 A | * | 1/1984 | Malen ........................ | 180/68.4 |
| 4,597,603 A | * | 7/1986 | Trabert ....................... | 296/194 |
| 4,940,281 A | * | 7/1990 | Komatsu ..................... | 296/194 |
| 5,106,148 A | * | 4/1992 | Ikeda et al. ................. | 296/194 |
| 5,271,473 A | * | 12/1993 | Ikeda et al. ................. | 180/68.4 |
| 5,358,304 A | * | 10/1994 | Kanemitsu et al. .......... | 296/194 |
| 5,533,780 A | * | 7/1996 | Larson et al. ............... | 296/194 |
| 5,544,714 A | * | 8/1996 | May et al. .................. | 180/68.4 |
| 5,573,299 A | * | 11/1996 | Masuda ...................... | 296/194 |
| 5,575,526 A | * | 11/1996 | Wycech ................... | 296/194 X |
| 5,658,041 A | * | 8/1997 | Girardot et al. ............ | 296/194 |
| 5,915,490 A | * | 6/1999 | Wurfel .................. | 180/68.4 X |

* cited by examiner

Primary Examiner—Robert P. Olszewski
Assistant Examiner—F. Zeender
(74) Attorney, Agent, or Firm—Morgan & Finnegan, LLP

(57) ABSTRACT

The structural assembly for the front end of a vehicle comprises a first part which defines headlamp mounting portions and which also has a region for locating the upper part of a cooling system. The assembly further comprises a second part, which supports the lower part of the cooling system, and further has nuts and bolts securing the two parts together.

31 Claims, 2 Drawing Sheets

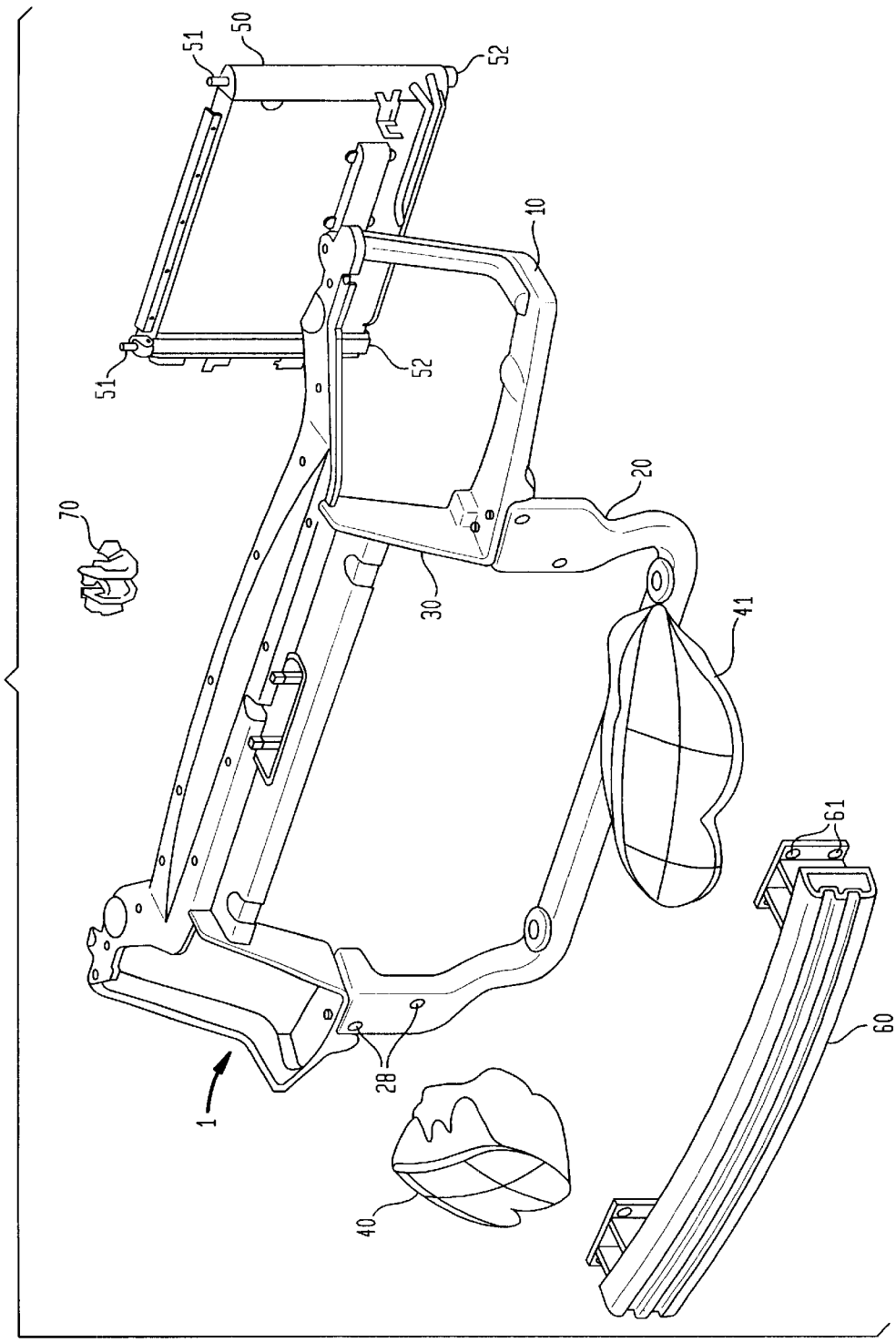

MODULAR VEHICLE FRONT END

FIELD OF THE INVENTION

The present invention relates to a vehicle front end assembly and to a method of assembling a vehicle.

BACKGROUND OF THE INVENTION

For sometime it has been realized that assembly of vehicles can be simplified by providing front end modules which combine the vehicle cooling system and the vehicle lighting system. The front end module consists of a support assembly which may be of plastics or metal and may provide mountings for the vehicle bumper.

By manufacturing the support assembly and pre-fitting the cooling components to the module, alignment problems are reduced, as well as reducing the cost and weight for the same function.

For the manufacturer there are a number of other advantages, namely reduction in the assembly time for a vehicle, space saving in plants and improved vehicle finish.

Although it is clearly desirable to manufacture the structural part of a front end module by a single simple inexpensive technique such as injection molding, it has been found that the resultant module may not have the necessary strength for all applications. With an integral support structure, it is also necessary to secure a cooling system comprising one or more heat exchangers, into an aperture defined by a continuous wall. This can require specialized attachments and cause access difficulties during repair.

It is accordingly an object of the present invention to provide a vehicle front end assembly in which a portion supporting the cooling apparatus is of sufficient strength. It is a second object of the present invention to simplify the attachment of a cooling apparatus to a vehicle front end assembly.

SUMMARY OF THE INVENTION

According to a first aspect of the present invention there is provided an assembly for a vehicle front end, the assembly having a first part and a second part, the first part defining headlamp mounting portions and having a region for locating the upper part of a cooling apparatus, and the second part, in use, engaging the lower part of said cooling apparatus, and further comprising securing devices for securing the first part to the second part.

Advantageously both said first and second parts comprise plastics material.

Conveniently the front first part is injection molded and the second part is blow molded.

Conveniently the securing devices comprise nuts and bolts.

Preferably the first part comprises a plastics overmolded metal member.

Advantageously the metal member is elongate.

Advantageously the metal member has a securing portion for securing thereto a hood latch.

Preferably the second part further comprises bumper beam securing devices.

Advantageously the bumper beam securing devices comprise holes in a front face of the second part.

Conveniently the holes are through-holes.

Advantageously the first part comprises an integral fan shroud portion.

Alternatively both the first and second parts have mountings for a separate fan shroud.

Conveniently the first part has mountings for vehicle fender attachments.

Advantageously the assembly defines air deflector portions for affecting air flow to a vehicle engine compartment.

According to a second aspect of the present invention there is provided a vehicle front end module, the module comprising a first part, a seconds part, securing device securing said first and second parts together and a cooling apparatus, the first part defining a headlamp mounting portions and having a region engaging the upper part of said cooling apparatus and the second part engaging the lower part of said cooling apparatus.

Advantageously the first and second parts comprise plastics material.

Conveniently the first part is injection molded and the second part is blow molded.

Conveniently said securing devices comprise nuts and bolts.

Preferably the first part comprises a plastics overmolded metal member.

Advantageously the module further comprises a hood latch secured to the first part.

Preferably the module further comprises a bumper beam secured to the second part.

Advantageously the first part comprises an integral fan shroud portion.

Alternatively both the first and second parts have mountings for a separate fan shroud.

Conveniently the first part has mountings for vehicle fender attachments.

Advantageously the assembly defines air deflector portions for affecting air flow to a vehicle engine compartment.

According to a third aspect of the present invention there is provided a method of assembling a vehicle comprising:
  providing a first part of a vehicle front end, said first part defining apertures for headlamps, and having a region for engaging the upper part of cooling apparatus;
  providing a second part of a vehicle front end, said second part having a portion for engaging the lower part of said cooling apparatus;
  providing said cooling apparatus;
  disposing said cooling apparatus into said engagement with said second part, and securing said second part to said first part whereby said cooling apparatus is supported by the assembly comprising said first and second parts.

Preferably said securing steps comprise disposing bolts through portions of one of said first and second parts, passing said bolts through the other of said parts and securing nuts on said bolts.

Preferably said method further comprises providing a structural bumper; and securing said structural bumper to said second part.

Advantageously said method further comprises securing said structural bumper to the vehicle whereby said front end and said cooling apparatus are secured to the vehicle.

Conveniently said method further comprises providing a hood latch, and securing said hood latch to said first part.

BRIEF DESCRIPTION OF THE DRAWINGS

An embodiment of the present invention will be described by way of example only, with reference to the accompanying drawings in which:

FIG. 2 shows the components of a vehicle front end module in accordance with a preferred embodiment of the invention.

DESCRIPTION OF THE PREFERRED EMBODIMENTS

Figure 1:
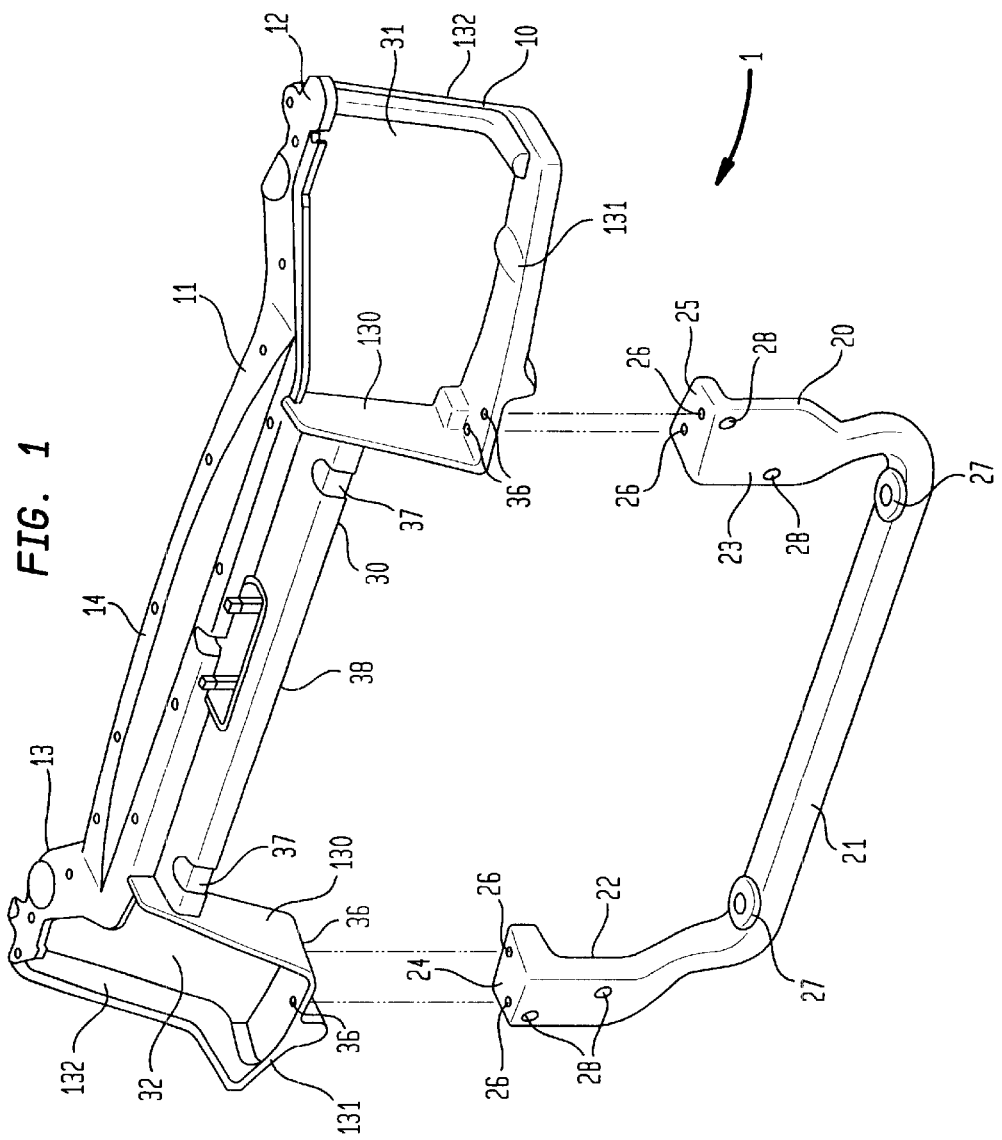
FIG. 1 shows an exploded perspective view of an assembly for a vehicle front end in accordance with a preferred embodiment of the invention.

In the various figures like reference numbers refer to like parts.

Referring first to FIG. 1 a vehicle front end assembly 1 comprises a first part 10 and a second part 20.

The first part consists of a metal member 11 which is generally elongate, having a straight central portion 14 and two end portions, 12, 13 which are angled back with respect to the center portion. The metal member 11 is overmolded with an injection molded plastics portion 30. The plastics portion has a central region 38 that extends generally downwardly from the metal member 11 in the central region and further defines, together with the end portions, 12, 13 of the metal member headlamp apertures 31, 32.

To achieve this, the plastics portion 30, at the end of the central region diverges substantially perpendicular to the central region into opposing first side portions 130, then extends to lower portions 131 disposed generally parallel to the end regions 12, 13 and terminates with return portions 132 to the end of the end region 12 of the metal member.

In the disclosed embodiment the underside of the end regions 12 and 13 of the metal member is also molded to the plastics portion, but this is not essential.

The assembly further comprises a second generally U-shaped part 20 which has a central member 21 which extends at both ends into vertically-upstanding portions 22 and 23. The ends 24, 25 of the upstanding portions 22, 23 have securing means 26 in the form of bolts which pass through corresponding holes 36 in the lower portions 131 of the upper plastics part 30 whereby the two parts are assembled together.

The second part 20 further has, on its front surface, securing holes 28 on each of the upstanding portions 22, 23 for the securing thereto of a structural bumper member.

When the two parts are assembled together, the second part together with the downwardly extending side portions 130 and the central region 38 of the plastic part 30 define an aperture for receiving a cooling assembly. To this effect, the center portion 21 of the lower part has holes 27 to each end thereof and the central region 38 of the plastic portion of the first part has holes 37 toward its ends.

Referring now to FIG. 2 the module and its assembly will now be described.

Referring to FIG. 2, the module comprises the front end structure assembly 1, two headlamps 40, 41, a cooling apparatus 50, a bumper 60 and a hood latch 70.

Continuing to refer to FIG. 2, it will be seen that the cooling apparatus, which typically comprises an engine cooling radiator, a condenser for an air conditioning and/or an oil cooler, together with a fan, fan motor and shroud, has two pins 51 extending upwardly from its upper ends and two pins 52 extending downwardly from its outer bottom ends.

To assemble the device, the downwardly extending pins 52 are located in the holes 27 not shown of the second part 20 and then the second part 20 is mated with the first part 10 such that the upper extending pins 51 of the cooling apparatus engage in the holes 37 not shown in the central region 38 of the first part and the bolts 26 of the second part engage in the holes 36 of the first part. Suitable nuts are secured on the extending bolt portions 26 so that the cooling apparatus 50 is captured by the assembly 1.

Alternatively, the cooling apparatus may be hard mounted into the module.

The structural bumper member 60 is then secured to the assembly 1 using the holes 28 with bolts passing through suitable holes 61 in the bumper 60. The headlamps 40, 41 are secured in the headlamp apertures 31, 32 and then the bumper is secured to the remainder of the vehicle via the bumper bolts which thereby secures the front end assembly to the remainder of the vehicle.

The first part (i.e., the upper part) of the front end may have mountings for the vehicle fender.

It will be understood by those skilled in the art that various other improvements can be made. Specifically, it is possible to replace the second part (i.e., the lower part) of the assembly by two half parts, one for each side of the cooling apparatus. The two half parts are secured together during assembly.

A further embodiment, not shown, integrates one or more fluid storage containers in the lower part 20, one of these being used as a radiator overflow tank and the other usable to store washing fluid for the windshield.

Yet another option is to secure the vehicle front panel for the grill of the vehicle to the assembly prior to manufacture.

It is also envisaged to integrate a fan shroud in the upper injection molded part. Wherein the fan shroud is not so integrated, a separate shroud is preferably provided, and the upper and lower parts of the assembly may have mountings for the separate shroud.

The upper and lower parts may have mountings for fascia attachments and the assembly may be modified to provide deflection of air flow into the engine compartment.

Various embodiments of the invention have now been described. It will be understood by those skilled in the art that the scope of the invention is not limited to what has been described, but what instead extends to the full scope of the appended claims.

What is claimed is:

1. An assembly for a vehicle front end, the assembly having a first part and a second part, the first part comprising a metal member and a plastics portion, the metal member extending the length of the first part and plastics overmolded by the plastics portion in a central region, the plastics portion extending from the metal member in the central region to define headlamp mounting portions, the first part having a region for locating an upper part of a cooling apparatus, and the second part formed of plastics material and, in use, engaging a lower part of said cooling apparatus, the assembly further comprising securing devices for securing the first part to the second part.

2. The assembly of claim 1 wherein the plastics portion of the first part is injection molded and the second part is blow molded.

3. The assembly of claim 1 wherein the securing devices comprise nuts and bolts.

4. The assembly of claim 1 wherein the first part is substantially elongate with end portions angled back with respect to the central region.

5. The assembly of claim 1 wherein the first part has a securing portion for securing thereto a hood latch.

6. The assembly of claim 1 wherein the second part further comprises bumper beam securing devices.

7. The assembly of claim 6 wherein the bumper beam securing devices comprise holes in a front face of the second part.

8. The assembly of claim 7 wherein the holes are through-holes.

9. The assembly of claim 1 wherein the first part further comprises an integral fan shroud portion.

10. The assembly of claim 1 wherein the first part and the second part have mountings for a fan shroud.

11. The assembly of claim 1 wherein the first part has mountings for vehicle fender attachments.

12. The assembly of claim 1 wherein one of the first part and the second part further defines air deflector portions for affecting air flow to a vehicle engine compartment.

13. A vehicle front end module, the module comprising
a first part comprising a metal member and a plastics portion, the plastics portion overmolding the metal member in a central region, the metal member extending the length of the first part,
a second part of plastics material,
a securing device for securing the first part and the second part together, and
a cooling apparatus having an upper part and a lower part,
wherein the metal member and the plastics portion of the first part define headlamp mounting portions and a region engaging the upper part of said cooling apparatus, and wherein the second part engages the lower part of said cooling apparatus.

14. The module of claim 13 wherein the plastics portion of the first part is injection molded and the second part is blow molded.

15. The module of claim 13 wherein said securing devices comprise nuts and bolts.

16. The module of claim 13 further comprising a hood latch secured to the first part.

17. The module of claim 13 further comprising a bumper beam secured to the second part.

18. The module of claim 13 wherein the first part further comprises an integral fan shroud portion.

19. The module of claim 13 wherein both the first part and the second part have mountings for a fan shroud.

20. The module of claim 13 wherein the first part has mountings for vehicle fender attachments.

21. The module of claim 13 wherein one of the first part and the second part further defines air deflector portions for affecting air flow to a vehicle engine compartment.

22. A method of assembling a vehicle comprising:
providing a cooling apparatus;
providing a first part of a vehicle front end, said first part comprising a metal member and a plastics portion, the metal member extending the length of the first part, the plastics portion overmolding the metal member in a central region, said first part defining apertures for headlamps and having a region for engaging an upper part of said cooling apparatus;
providing a second part of a vehicle front end, said second part formed of a plastics material and having a portion for engaging a lower part of said cooling apparatus;
disposing said cooling apparatus into engagement with said first part and said second part, and
securing said second part to said first part whereby said cooling apparatus is supported by the assembly comprising said first part and said second part.

23. The method of claim 22 wherein said securing step comprises
disposing bolts through portions of one of said first part and said second part,
passing said bolts through the other of said first part and said second part and
securing nuts on said bolts.

24. The method of claim 22, further comprising providing a structural bumper, and securing said structural bumper to said second part.

25. The method of claim 24, further comprising securing said structural bumper to the vehicle whereby said assembly and said cooling apparatus are secured to the vehicle.

26. The method of claim 25, further comprising securing vehicle fenders to the first part of said front end.

27. The method of claim 22 further comprising providing a hood latch, and securing said hood latch to said first part.

28. The method of claim 22, wherein said step of providing a first part further comprises overmolding the central region of the metal member, and said step of providing a second part further comprises forming said second part by blow molding.

29. A vehicle comprising the assembly of claim 1.

30. A vehicle comprising the module of claim 13.

31. An assembly for a vehicle front end, the assembly comprising:
a first part comprising:
an elongate metal member extending the length of the first part, the elongate metal member plastic overmolded in a central region and having a securing portion for securing thereto a hood latch,
a headlamp mounting device, the elongate member and the headlamp mounting device defining a first region for engaging an upper part of a cooling apparatus,
a fender attachment mounting device, and
an integral fan shroud mounting device;
a second part of plastics material said second part comprising:
a second region for engaging a lower part of said cooling apparatus,
a bumper beam securing device,
an integral fan shroud mounting device;
wherein said first part and said second part are at least partially formed of a plastic material by injection molding or blow molding;
a securing device for securing said first part to said second part; and
an air deflector for affecting air flow to an area adjacent said vehicle front end.

* * * * *